United States Patent [19]
Houston et al.

[11] Patent Number: 5,785,499
[45] Date of Patent: Jul. 28, 1998

[54] TURBINE BLADE DAMPER AND SEAL

[75] Inventors: David P. Houston, Glastonbury; Natalie A. Pelland, Tolland; Michael Gonsor, Hebron, all of Conn.; David Airey, Pelham, N.H.

[73] Assignee: United Technologies Corporation, Hartford, Conn.

[21] Appl. No.: 773,017

[22] Filed: Dec. 24, 1996

[51] Int. Cl.$^6$ .................................................. F04D 29/18
[52] U.S. Cl. ........................................ 416/248; 416/500
[58] Field of Search .................................... 416/248, 500, 416/190, 193 A

[56] References Cited

U.S. PATENT DOCUMENTS

| | | | |
|---|---|---|---|
| 3,112,915 | 12/1963 | Morris | 253/77 |
| 3,610,778 | 10/1971 | Suter | 416/210 |
| 3,751,183 | 8/1973 | Nichols et al. | 416/220 |
| 3,887,298 | 6/1975 | Hess et al. | 416/220 |
| 4,101,245 | 7/1978 | Hess et al. | 416/190 |
| 4,182,598 | 1/1980 | Nelson | 416/193 |
| 4,183,720 | 1/1980 | Brantley | 416/193 A |
| 4,473,337 | 9/1984 | Leonardi et al. | 416/500 |
| 4,516,910 | 5/1985 | Bouiller et al. | 416/190 |
| 4,872,812 | 10/1989 | Hendley et al. | 416/190 |
| 5,156,528 | 10/1992 | Bobo | 416/190 |
| 5,228,835 | 7/1993 | Chlus | 416/193 |
| 5,302,085 | 4/1994 | Dietz et al. | 416/220 |
| 5,415,526 | 5/1995 | Mercadante et al. | 416/190 |
| 5,460,489 | 10/1995 | Benjamin et al. | 416/500 |
| 5,513,955 | 5/1996 | Barcza | 416/95 |
| 5,573,375 | 11/1996 | Barcza | 416/190 |

*Primary Examiner*—John T. Kwon
*Attorney, Agent, or Firm*—Mark Steinberg

[57] ABSTRACT

An integral damper and seal for a turbine blade in a gas turbine engine includes a damper portion which contacts the platform and at least one sealing portion, angled radially inward from the damper portion, which makes contact with and seals against the platform.

18 Claims, 4 Drawing Sheets

TURBINE BLADE DAMPER AND SEAL

TECHNICAL FIELD

The invention relates to gas turbine engines and more particularly to integral damper and seal configurations for turbine rotors.

BACKGROUND ART

A typical gas turbine engine has an annular axially (longitudinally) extending flow path for conducting working fluid sequentially through a compressor section, a combustion section, and a turbine section. The turbine section includes a plurality of blades distributed among one or more rotating turbine disks. Each blade has a platform, a root and an airfoil. The root extends from one surface of the platform, and the airfoil projects from an opposing surface. The airfoil extracts energy from the working fluid.

The turbine disk has a series of perimeter slots, each of which receives a blade root, thereby retaining the blade to the disk. The blade extends radially from the disk, with the root radially inward and the airfoil radially outward. The perimeter slots are spaced so as to provide an axially extending gap between adjacent blade platforms, which keeps the blade platforms from contacting and damaging each other.

As the airfoils, which may be shrouded or unshrouded, extract energy from the working fluid, the working fluid exerts a loading force on the airfoils. Variations in the loading force cause the blades to deflect and vibrate. This vibration has a broad spectrum of frequency components, with greatest amplitude at the natural resonant frequency of the blades. When the airfoils are unshrouded, the vibration is primarily tangential to the direction of rotation, i.e. the circumferential direction. There, is also a secondary vibration component in the direction of fluid flow, i.e. the axial direction. If undamped, the deflection of the vibrating blades can reach extreme limits, potentially causing the airfoil to break.

A damper is generally employed to reduce such vibration. The damper is a rigid element which spans the gap between blades and contact a radially inner surface on each of the adjacent blade platforms. A friction force is thereby applied by the damper to the platforms. This friction force reduces blade to blade vibration and consequently reduces individual blade vibration.

Problems can also arise from leakage of the working fluid into the gap between adjacent blade platforms. Once in the gap, the working fluid can leak into an area beneath the radially inner surfaces of the platforms. However, the temperature of the working fluid in the turbine is generally higher than that which components beneath the platform can safely withstand for extended durations. In addition, the working fluid may contain and transport contaminants, such as by-products of the combustion process in the combustion section, beneath the platform, where they can collect and heat up, causing corrosion and cracks. Furthermore, the leaking working fluid circumvents the airfoils, thus reducing the amount of energy delivered to the airfoils.

A seal is generally employed to reduce leakage. The seal is a flexible element, typically made of thin sheet metal, which is positioned across the gap, beneath and in proximity to the radially inner surfaces of adjacent blade platforms. The seal typically has a portion which generally conforms to that of the surfaces which it seals. The seal must be radially supported in order to avoid adverse seal distortion in the presence of centrifugal force.

However, there are several problems associated with the separate damper and seal described above. First, they can not concurrently provide maximum effectiveness, because one must be positioned radially inward of the other. For example, where the damper is positioned between the platform and the seal, the damper prevents the seal from effectively covering the gap between the adjacent platforms. In addition, performance constraints on the damper limit the amount of radial support that it can provide to the seal, making the seal susceptible to adverse distortion and further reduced effectiveness. Alternatively, the seal may be positioned between the platform and the damper, but damping effectiveness is then reduced because the damper does not have direct access to the platform radially inner surface for damping.

Furthermore, regardless of the arrangement, a separate damper and seal combination such as that described above cannot provide maximum damping effectiveness. The total mass of a damper and seal combination is limited by system requirements. While the damper is rigid and provides stiffness for damping, the seal is flexible and does not provide such stiffness. Thus, the presence of such a flexible seal means that less mass and stiffness is available for vibration damping. Moreover, because of constraints on the design of the damper, the damper often provides more damping force at its axial center and less damping force at its ends, thereby hindering uniform damping force distribution.

Still further, the separate damper and seal are occasionally installed improperly, thereby reducing the effectiveness of both. The potential for this is increased by the fact that some arrangements have the damper between the platform and the seal, while others have the seal between the platform and the damper. Thus a better damper and seal are sought.

DISCLOSURE OF THE INVENTION

To overcome the problems described above, the integral damper and seal of the present invention has a substantially rigid damper portion in contact with adjacent blade platforms, and at least one sealing portion which extends generally radially inward from the damper at an angle from the general plane of the damper, thereby making contact with and sealing against platform sealing portions (skirts) which extend generally radially inward at an angle from a longitudinal axis. The sealing portions may further be coextensive with a majority of the associated platform sealing surface, and may have offset subportions to seal to offset platforms. The damper and seal is preferably shaped to provide a clearance to the transition portion of the platform in order to prevent interferences which would impair damping and sealing effectiveness. The damper and seal is preferably formed by casting it as an integral piece. In the preferred embodiment, the integral damper and seal has two such sealing portions, one for sealing to the upstream side of the platform and one for sealing to the downstream side.

The integral damper and seal of the present invention improves sealing because the sealing portions make contact with a greater portion of the axial length of the gap between the platforms. This reduces leakage and contamination, thereby increasing the reliability of the turbine. The integral damper and seal also has greater durability because the sealing portions are more fully radially supported, which reduces undesired distortion, thereby maintaining seal effectiveness. Furthermore, although the sealing portions are primarily for sealing they also contribute some stiffness, meaning that more stiffness is now available for vibration damping. Still further, the presence of the sealing portions facilitates better axial distribution of the damping mass. Lastly, because the integral damper and seal is one piece instead of two, it generally costs less to manufacture and is less likely to be improperly installed.

While integral dampers and seals are known, up until now, it was thought that an integral damper and seal could only seal in a radially outward direction, i.e. that the inherent rigidity required for damping would preclude sealing in the longitudinal direction. It was also believed that, because of its inherent rigidity, an integral damper and seal which tried to seal in the longitudinal direction, i.e. against the skirts, would inevitably encounter interferences with these surfaces, causing it to become mispositioned (hung up), and thereby lose its damping effectiveness as well. However, it has been determined that rigidity is not inapposite to sealing, that an integral seal can be made rigid enough to damp on a radially outward surface yet flexible enough to seal longitudinally against substantially angled platforms.

BEST MODE EMBODIMENT FOR CARRYING OUT THE INVENTION

Figure 1:
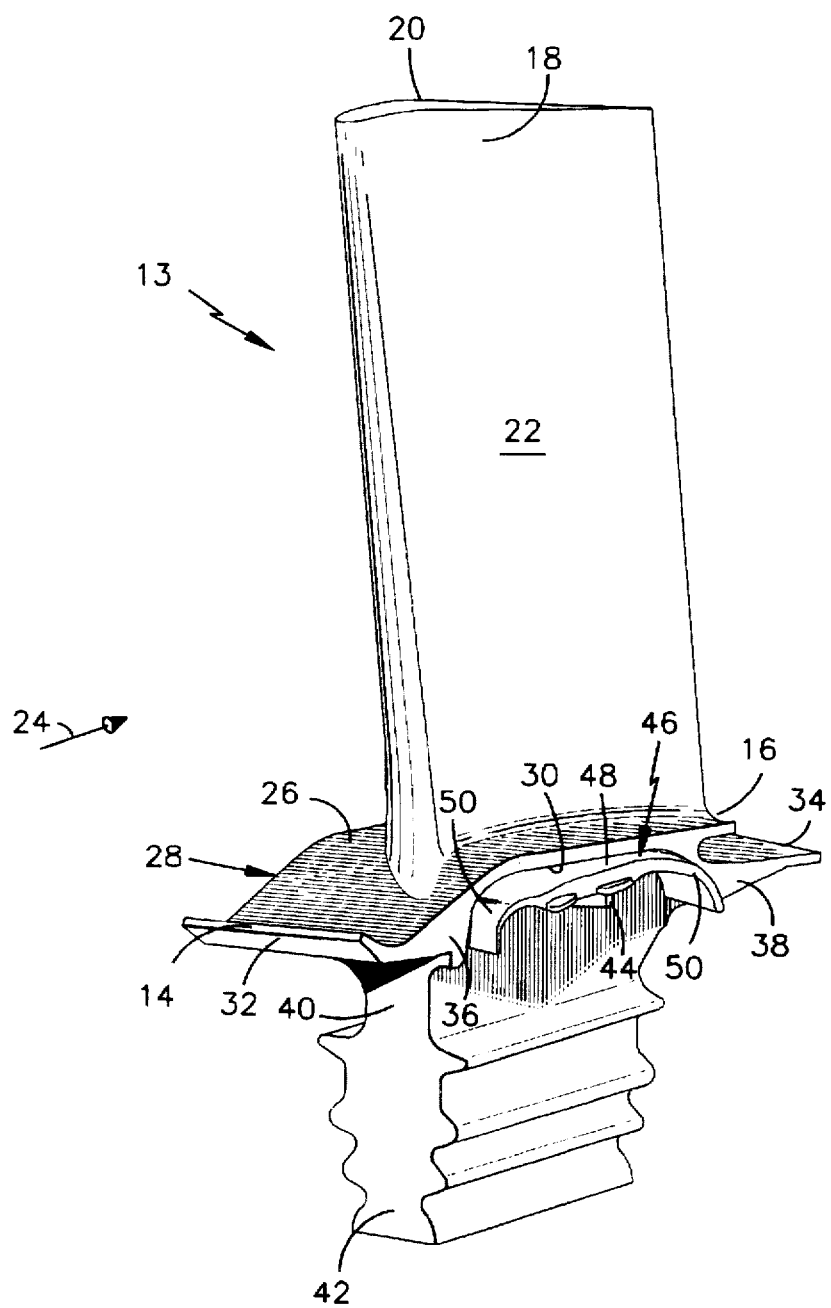
FIG. 1 is a perspective view of a turbine rotor blade and the integral damper and seal of the present invention.

The damper and seal configuration of the present invention is disclosed with respect to a best mode embodiment for use with a second stage high pressure turbine rotor blade of the type illustrated in FIG. 1.

Referring to FIG. 1, a turbine rotor blade 13 has an upstream side 14, a downstream side 16, a concave (pressure) side 18, and a convex (suction) side 20. The blade 13 has an airfoil 22, which receives kinetic energy from a gas flow 24. The airfoil 22, which may be shrouded or unshrouded, extends from a radially outer surface 26 of a platform 28. The platform 28 has a radially inner surface 30, a leading edge 32 and a trailing edge 34.

The blade 13 further comprises a pair of platform supports 36, 38, a neck 40, and a root 42. The neck 40 is the transition between the platform 28 and the root 42. The root 42 is adapted to be inserted into a turbine rotor disk (not shown) to attach the rotor blade to the disk. Here, the root 42 has a fir tree cross section. The neck 40 has a pair of protrusions 44 (only one shown) which are described and shown in further detail hereinbelow.

It will be understood that the rotor blade 13 is one of a plurality of such blades attached to the rotor disk (not shown). The blade 13 extends radially from the surface of the disk, with the root 42 extending radially inward and the airfoil 22 extending radially outward. Adjacent blade platforms are separated by an axially (longitudinally, i.e. the direction from the platform leading edge 32 to the platform trailing edge 34) extending gap, which keeps the blades platforms from contacting and damaging each other. The width of this gap should be large enough to accommodate the tolerances in the physical dimensions of the platforms including thermal expansion, and is preferably, on the order of about 0.04 inches.

Located beneath the radially inner surface 30 of the platform 28 is an integral damper and seal combination 46, comprising a damper portion 48 and a sealing portions 50, joined together by such means as brazing, or, to reduce cost, integrally fabricated in one piece as by casting. Machining, forging, rolling, and stamping, and combinations thereof, may also be used. Unlike arrangements having a separate damper and seal, neither the damper portion 48 nor the sealing portions 50 are positioned between the platform and the other, but rather, the sealing portions 50 extend radially inward from the ends of the damper portion 48. This provides better radial support for the sealing portions compared to that which can be provided by a separate damper between a platform and a seal.

The damper portion 48 is rigid and adapted to reduce blade-to-blade vibration which consequently reduces individual blade vibration. The shape, weight, and stiffness of the damper portion 48 are selected to best provide the desired friction force to the platforms for such damping. The sealing portions 50 are adapted to reduce leakage. The damper portion 48 and sealing portions 50 span across the gap between the platform 28 and the adjacent blade platform (not shown). The shape, weight, and stiffness of the sealing portions 50 are selected to best provide such sealing. The damper portion 48 and sealing portions 50 are radially supported by the pair of protrusions 44 on the blade 13 neck 40.

Figure 2:
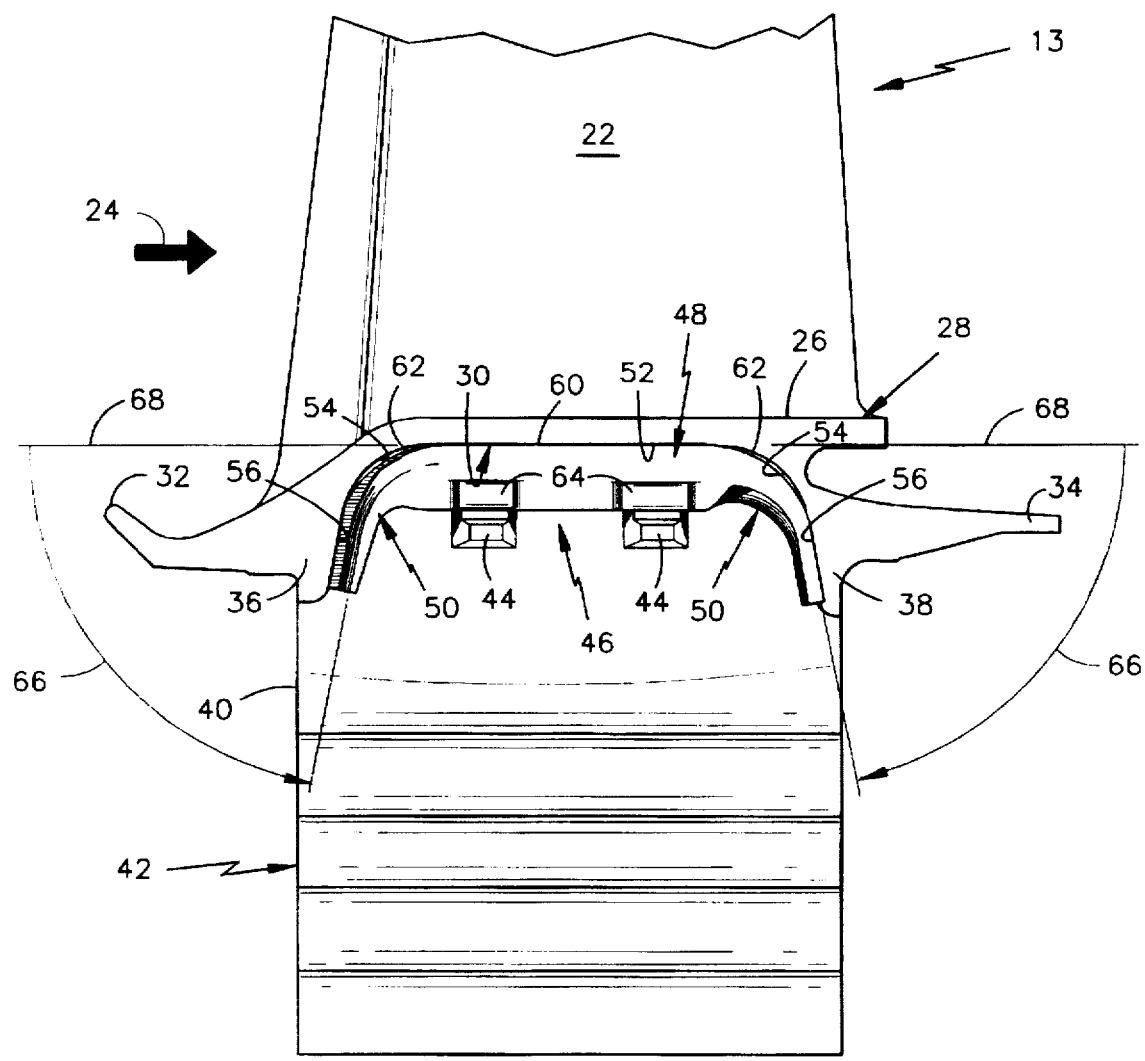
FIG. 2 is a fragmentary side view of the rotor blade and the integral damper and seal of FIG. 1.

Referring now to FIG. 2, the radially inner surface 30 of the blade platform 28 has a damping portion 52, a transition portion 54 and a sealing portion (skirt) 56. The damping portion 52 has a substantially planar contour. The transition portion 54 comprises upstream and downstream fillet runouts, having a substantially arcuate contour, and which typically contact neither the damper nor the sealing portions. Largely for this reason, no damping or sealing typically occurs in the transition portion 54. The sealing portion 56 is generally located where sealing against leakage is sought, which for this blade 13, is in the proximity of the platform supports 36, 38 (the pressure on the radially outer surface 26 of the platform 28 is generally greater than that on the radially inner surface 30, particularly in the proximity of the platform supports 36, 38). With most platform geometries, the sealing portion 56 is angled generally radially inward, typically at an angle of at least 45 degrees measured from the longitudinal axis, most often in the range of from about 60 degrees to 90 degrees. Geometries at the high end of this range, e.g., from about 75 to 90 degrees, are generally more difficult to seal against than those than at the low end, because the available sealing force, i.e. the component of centrifugal force directed perpendicular to the sealing portion, is less than that for geometries at the low end of the range.

The damper portion 48 has a damping surface 60 in contact with the damping portion 52 of the platform radially inner surface 30. The damping surface 60 in combination with centrifugal force and the mass of the damper and seal 46, provide the friction force necessary to dampen vibration. Generally, substantially uniform contact is sought between the surfaces 52, 60. To maintain such contact, the damping surface 60 preferably does not extend into the transition portion 54 of the platform radially inner surface 30. Consequently, the dimensions of the damping surface 60 may be substantially limited by features of the platform radially inner surface 30. Clearances 62, between the integral damper and seal combination 46 and the transition portion 54 of the radially inner surface 30 of the platform 28, may be used to further obviate interference between those parts to allow uniform continuous contact between the damping surface 60 and the damping portion 52 of the platform radially inner surface 30. Combining the damper and seal into an integral component results in a compact arrangement efficiently housed beneath the platform. Thus it will be recognized that the clearances 62 function similarly, but are smaller than the clearances which accommodate separate damper and seal arrangements. Smaller clearances result in more effective sealing and greater radial support for the sealing portions 50, thereby preventing adverse distortion and maintaining sealing effectiveness. The damper portion 48 further comprises a first pair of nubs 64 adapted to keep the integral damper and seal 46 properly positioned with respect to the adjacent rotor blade (not shown).

The damper portion should comprise a material and should be manufactured by a method which is suitable for the high temperature, pressure and centrifugal force found within the turbine. It is further desirable to select a material which resists creep and corrosion under such conditions. A cobalt alloy material, American Metal Specification (AMS) 5382, and fabrication by casting, have been found suitable for high pressure turbine conditions, however any other suitable material and method of fabrication known to those skilled in the art may also be used.

The sealing portions 50 are adapted to conform closely with and provide seals against the sealing portion 56 of the platform radially inner surface 30. Each of the sealing portions 50 has a proximal end, transitioning and joined to the damper portion and a distal end, which is preferably free. The sealing portions 50 are preferably tapered to accommodate stress, gradually reducing in thickness from proximal end to distal end. The distal ends of the sealing portions 50 may be rounded. An arcuate bend at the transition between the damper portion and sealing portions 50 is preferred. The bend preferably has a radius which is greater than that of the transition portion 54 of the platform radially inner surface 30.

To comply with most platform geometries, the sealing portions 50 extend generally radially inward from the damper portion 48, typically at an angle 66 of at least 45 degrees, most often in the range of about 75 to 90 degrees, measured from the general plane 68 of the damper portion, neglecting the bend at the transition. With the illustrated shape, the sealing portions 50 receive radial support from the damper portion 48 and the platform, and provide sealing against leakage, without interfering substantially with the operation of the damper 48. Although the sealing portions 50 appear similar to each other, the sealing portions 50 need not have such similarity. It will be apparent to those of ordinary skill in the art that the sealing portions 50 may have any other orientation and shape which is suitably adapted to provide sealing and accommodate the stress.

It should be recognized that the thickness of the sealing portions 50 is generally not as great as that of the damper portion 48. This makes the sealing portions more flexible, i.e. less rigid, than the damper portion, and thereby enhances the ability of the sealing portions to conform to the radially inner surface of the platform. However, the sealing portions 50 are generally thicker than traditional seals, which are typically comprised of a thin sheet of metal. Although it could be inferred otherwise by those skilled in the art, such increased thickness does not adversely impact the ability of the sealing portions to seal. Flexibility is also sought to prevent undesired interaction between the sealing portions 50 and inner surfaces 54, 56 which might otherwise interfere with the contact between the damping surface 60 and the damping portion 52 of the platform radially inner surface 30.

When the engine is not operating, the combined damper and seal fits loosely beneath the platform. Upon engine startup, contact to the platform radially inner surface is preferably realized first by the damper portion 48 and then by the sealing portions 50. It is expected that centrifugal force will force the sealing portions into closer proximity with the sealing surfaces of the platform.

The sealing portions 50 should comprise a material and should be manufactured by a method which is suitable for the high temperature, pressure and centrifugal force found within the turbine. It is further desirable to select a material which resists creep and corrosion under such conditions. The ductility, or pliability, of the sealing portions 50 at elevated temperatures (about 1500 degrees for high pressure turbine applications) preferably approximates that of the traditional seal, which typically comprises a cobalt alloy material such as American Metal Specification (AMS) 5608 and which becomes stiffer, less pliable, at elevated temperatures. When formed integrally with the damper portion, the sealing portions will be formed from the same material which as set forth hereinabove comprises, a cobalt alloy material, American Metal Specification (AMS) 5382, and fabrication by casting, have been found suitable. However, any other suitable material and method of fabrication known to those skilled in the art may also be used.

Figure 3:
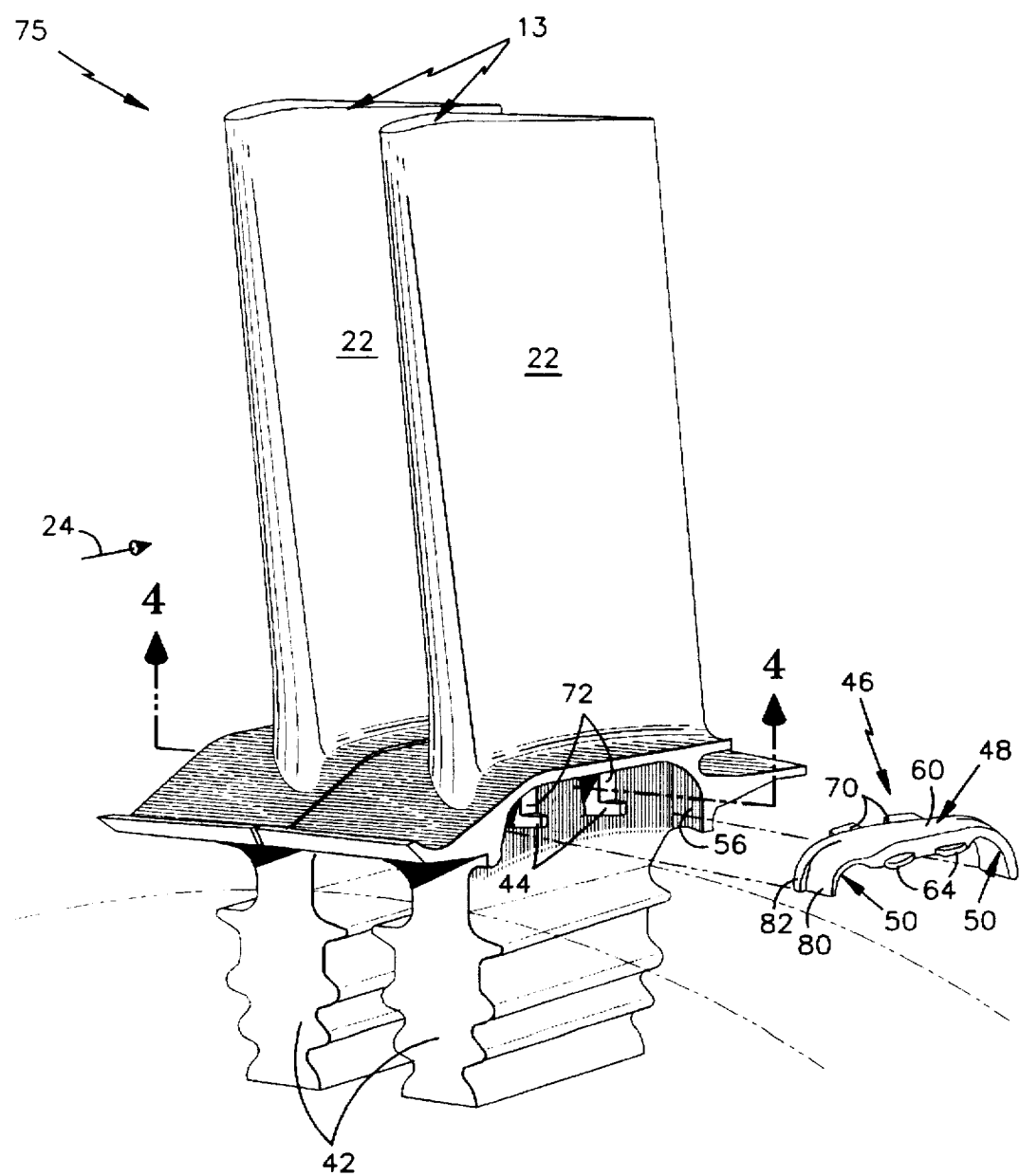
FIG. 3 is an exploded perspective view of two adjacent rotor blades in a staggered orientation and the integral damper and seal of FIG. 1.
Figure 4:
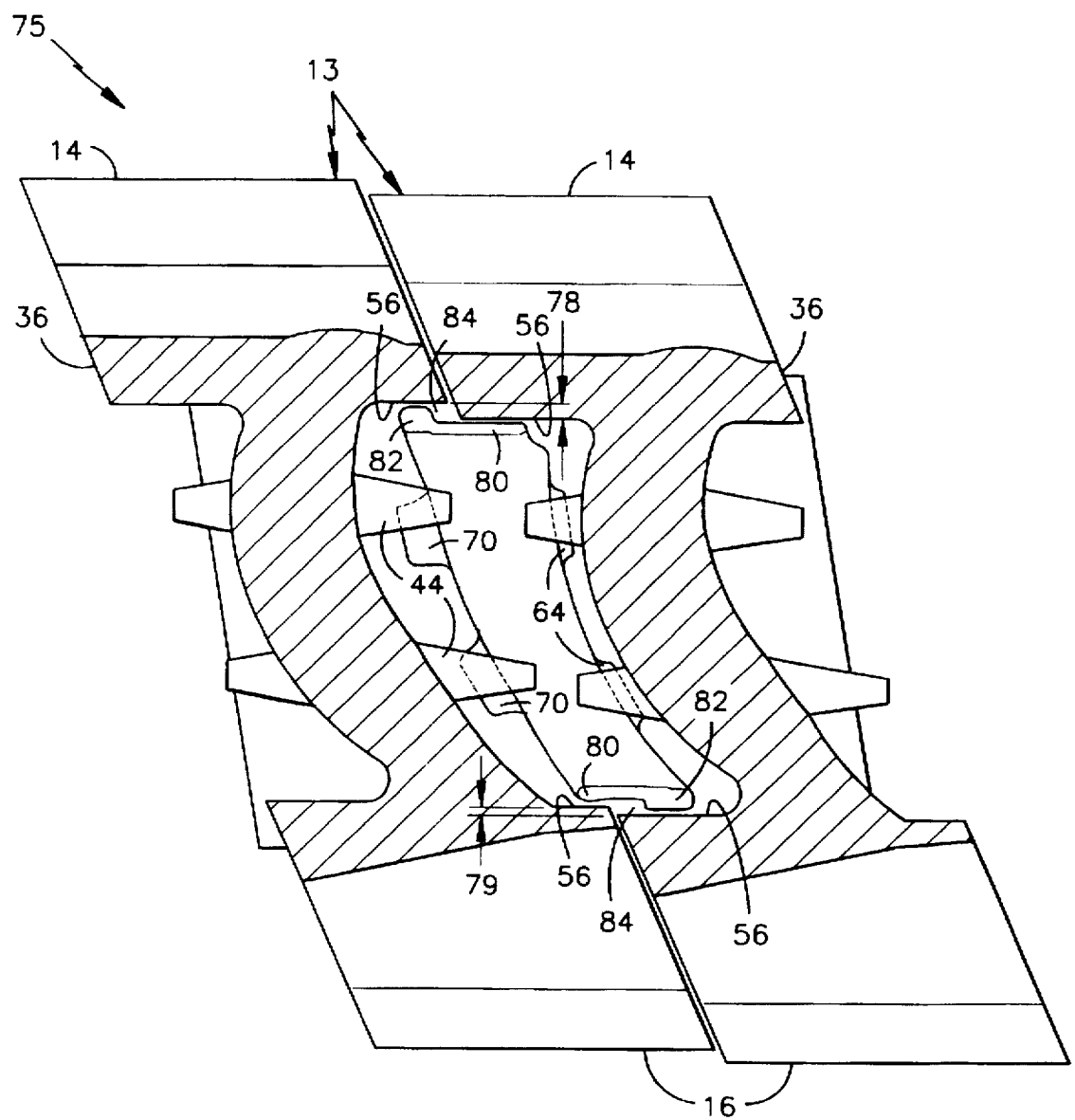
FIG. 4 is a cross section view, in the direction of 4—4, of the blades of FIG. 3, and the integral damper and seal of FIG. 1 installed between them.

Referring now to FIGS. 3, 4, the integral damper and seal 46 further comprise a second pair of nubs 70. The second pair of nubs 70 are adapted to operate in conjunction with the first pair of nubs 64, and a pair of stand-offs 72 on a pair 75 of adjacent blades 13, to help keep the integral damper and seal 46 in proper position with respect to the blade 13, i.e. the platform radially inner surface 30 and the neck 40. The appropriate number and size of the nubs and stand-offs depend on the dimensions of the blade 13 and the gap between the blades, as well as the dimensions and desired positioning of the integral damper and seal 46.

As is sometimes the case in large gas turbine aircraft engines, the pair 75 of blades 13 are staggered, e.g., by machining, so that the airfoils 22 are optimally oriented with respect to the roots 42. However, as a result of staggering, the sealing portions 56 of the adjacent platform surfaces are axially offset 78, 79 (FIG. 4), on the upstream side and downstream side 16 of the pair 75 of blades 13. To accommodate the offset between the platforms, each of the sealing portions 50 may comprise two axially offset subportions 80, 82, each of which provide sealing to an associated one of the adjacent platform radially inner sealing surfaces 56, where the offset between the subportions 80, 82 preferably corresponds to the offset between the platforms. Clearances 84 between the extended subportions 82 and the platform associated with the other of the subportions 80 obviate any interference between those parts, thereby preventing the integral damper and seal from becoming improperly positioned in relation to the radially inner surfaces. Those of ordinary skill in the art should recognize that the integral damper and seal 46 has a curved shape to accommodate blade 13 considerations which are not relevant to the present invention.

The integral damper and seal of the present invention improves sealing because the sealing portions make contact with a greater portion of the axial length of the gap between the platforms. This reduces leakage and contamination, thereby increasing the reliability of the turbine. The integral damper and seal also has greater durability because the sealing portions are more fully radially supported, which reduces undesired distortion, thereby maintaining seal effectiveness. Furthermore, although the sealing portions are primarily for sealing they also contribute some stiffness, meaning that more stiffness is now available for vibration damping. Still further, the presence of the sealing portions facilitates better axial distribution of the damping mass. Lastly, because the integral damper and seal is one piece instead of two, it generally costs less to manufacture and is less likely to be improperly installed.

While the seal of the present invention is disclosed as having two similar sealing portions with offset subportions, some applications may require only one sealing portion and others may require more than two. Further, the sealing portions need not have offset subportions, e.g. the sealing portions may be substantially planar, and need not be similar to each other. Those skilled in the art should also recognize that the integral damper and seal may be used with non-staggered as well as staggered platforms.

While the particular invention has been described with reference to various embodiments for use in a second stage high pressure turbine application, this description is not meant to be construed in a limiting sense. The present invention may be suitably adapted for other applications, including, but not limited to other turbine applications, having different blade and platform geometries than that described. It is understood that various modifications of the above embodiments, as well as additional embodiments of the invention, will be apparent to persons skilled in the art upon reference to this description, without departing from the spirit of the invention, as recited in the claims appended hereto. It is therefore contemplated that the appended claims will cover any such modifications or embodiments as fall within the true scope of the invention.

What is claimed is:

1. An integral damper and seal for a turbine rotor blade in a gas turbine engine, the engine having a longitudinal axis, each blade having a platform with an upstream side and a downstream side, the radially inner surface of said platform having a damping portion, a sealing portion, and a transition portion located between them, the sealing portion extending generally radially inward from the damping portion, the integral damper and seal being characterized by:

a substantially rigid damper portion, having a damping surface in contact with the damping portion of the radially inner surfaces, said damper portion being generally disposed in a plane; and at least one sealing portion having a proximal end joined to said damper, and a distal end which is free, said sealing portion extending generally radially inward from said damper portion at an angle from said general plane, said sealing portion making contact and sealing in combination with the associated sealing portion of the adjacent blade platform radially inner surfaces.

2. The damper and seal according to claim 1 wherein said damper portion fairs into said sealing portion such that the proximal end of the sealing portion and the end of the damper portion have thicknesses which are substantially the same as each other.

3. The damper and seal according to claim 1 wherein said sealing portion is substantially coextensive with the majority of the associated sealing portion of the platform.

4. The damper and seal according to claim 1 wherein said sealing portion is substantially coextensive with the entire associated sealing portion of the platform.

5. The damper and seal according to claim 1 wherein said integral damper and seal is of a shape which defines a clearance relative to the transition portion of the radially inner surface of the platform.

6. The damper and seal according to claim 1 wherein said angle from said general plane is in the range of from about 60 to 90 degrees.

7. The damper and seal according to claim 1 wherein said angle from said general plane is in the range of from about 75 to 90 degrees.

8. The damper and seal according to claim 1 wherein said damper and seal is formed by casting as an integral component.

9. The damper and seal according to claim 1 wherein the sealing portion has at least two subportions longitudinally offset from one another.

10. The seal according to claim 1 wherein there are two of said sealing portions, one being an upstream sealing portion for sealing to the sealing portion of the radially inner surface on the upstream side of the platform, the other of said two sealing portions being a downstream sealing portion for sealing to the sealing portion of the radially inner surface on the downstream side of the platform.

11. The damper and seal according to claim 10 wherein said integral damper and seal is of a shape which defines a clearance relative to the transition portion of the radially inner surface of the platform.

12. The damper and seal according to claim 11 wherein said damper portion fairs into said sealing portion such that the proximal end of the sealing portion and the end of the damper portion have thicknesses which are substantially the same as each other.

13. The damper and seal according to claim 11 wherein said sealing portion is substantially coextensive with the majority of with the associated sealing portion of the platform.

14. The damper and seal according to claim 11 wherein said sealing portion is substantially coextensive with the entire associated sealing portion of the platform.

15. The damper and seal according to claim 11 wherein said angle from said general plane is in the range of from about 60 to 90 degrees.

16. The damper and seal according to claim 11 wherein said angle from said general plane is in the range of from about 75 to 90 degrees.

17. The damper and seal according to claim 11 wherein said damper and seal is formed by casting as an integral component.

18. The damper and seal according to claim 11 wherein the sealing portion has at least two subportions longitudinally offset from one another.

* * * * *